United States Patent
Glance

[15] 3,693,471
[45] Sept. 26, 1972

[54] ARTICULATED BRAKE PEDAL
[72] Inventor: Patrick M. Glance, Plymouth, Mich.
[73] Assignee: Ford Motor Company, Dearborn, Mich.
[22] Filed: Dec. 22, 1970
[21] Appl. No.: 100,612

[52] U.S. Cl. ..................74/518, 74/522, 74/540, 188/348
[51] Int. Cl. ...........................................G05g 1/04
[58] Field of Search........74/518, 516, 517, 522, 512, 74/540; 188/348

[56] References Cited
UNITED STATES PATENTS
1,754,387  4/1930  Hall..................74/518 X FOREIGN PATENTS OR APPLICATIONS
297,740  12/1929  Great Britain..............74/512

Primary Examiner—Milton Kaufman
Attorney—John R. Faulkner and Clifford L. Sadler

[57] ABSTRACT

A variable ratio parking brake pedal assembly for a motor vehicle including a foot-operated articulated pedal lever. The articulated pedal has a first pedal section pivotally supported on vehicle body structure and connected to a brake actuator cable. A second section is pivotally connected to the first section and is constructed to swing through an arc whereby the effective length of the lever arm between the pivot and the pedal pad is increased during a brake application.

5 Claims, 3 Drawing Figures

PATENTED SEP 26 1972 3,693,471
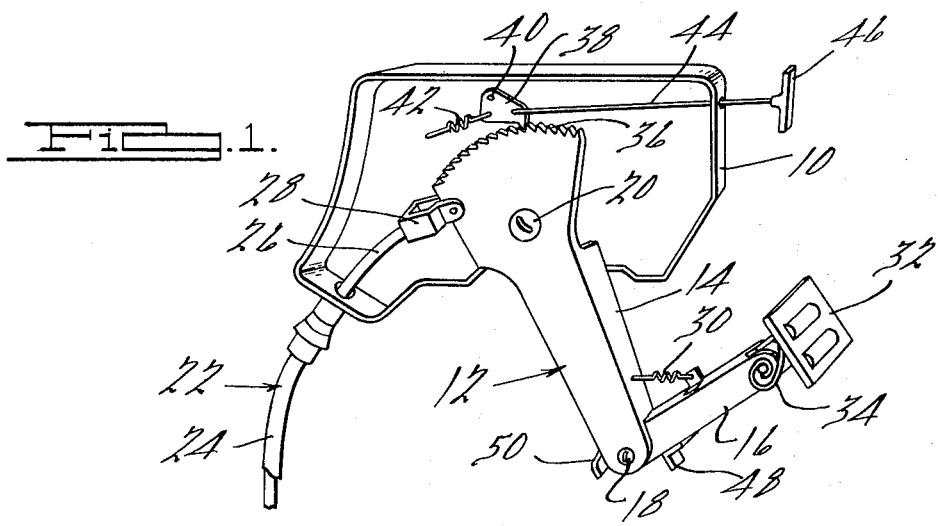
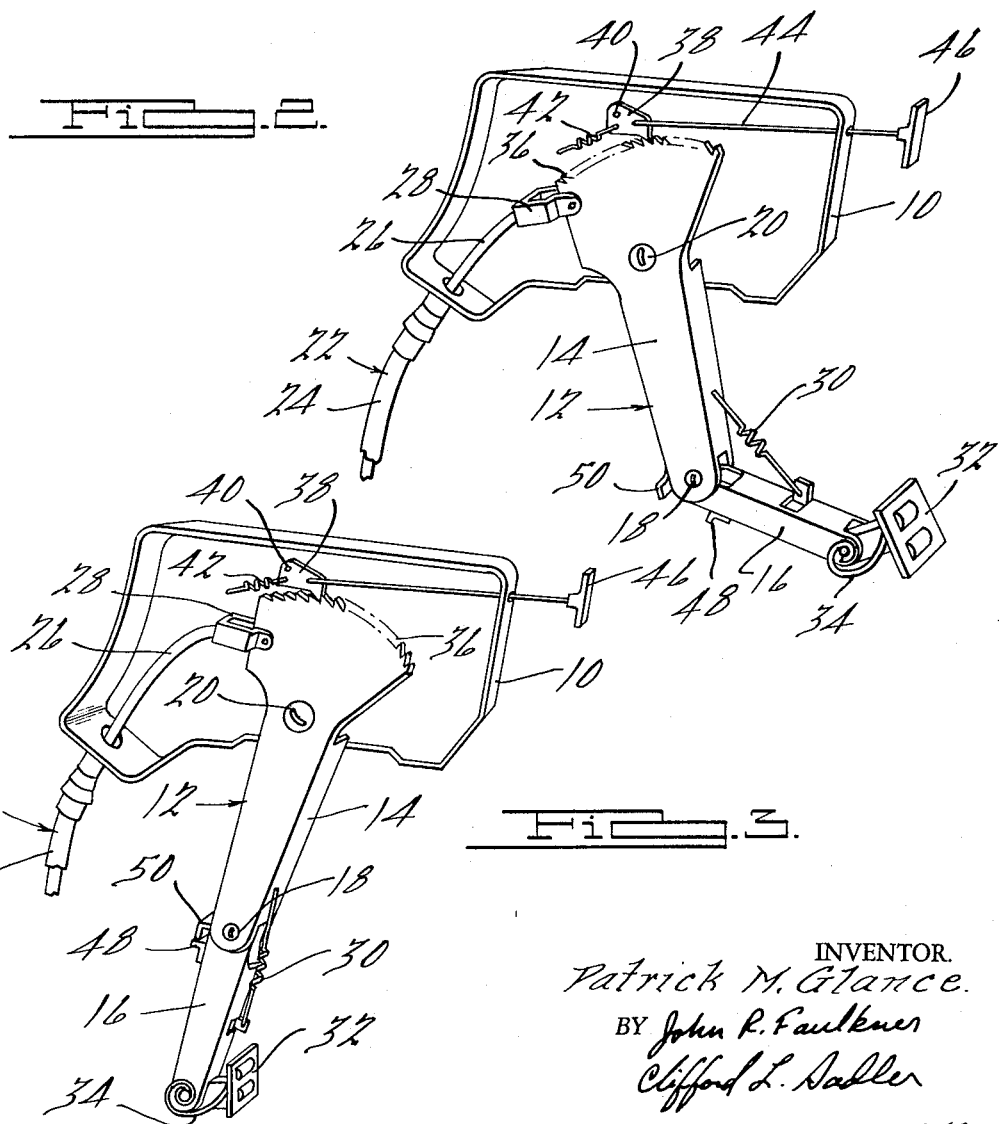
INVENTOR.
Patrick M. Glance.
BY John R. Faulkner
Clifford L. Sadler
ATTORNEYS.

ARTICULATED BRAKE PEDAL

BACKGROUND OF THE INVENTION

With the brake system of the average motor vehicle there is a certain amount of lost motion that occurs merely moving the shoes from their retracted position into initial contact with the brake drum. A part of the brake pedal movement is used in merely taking up the normal slack in the brake actuator system. Relatively low efforts are required by the vehicle operator to move the brake pedal through this initial phase prior to the actual brake application.

It is an object of this invention, therefore, to provide a brake pedal system for applying the brakes of a motor vehicle wherein the pedal system affects a rapid movement of the brake shoe assembly into engagement with the brake drum on a relatively short initial stroke of the brake pedal pad and at an effective mechanical advantage ratio that is lower than is desired for high pressure brake application.

It is also an object of the invention to provide a brake applying lever system that accomplishes the foregoing object and wherein the effective mechanical advantage ratio is increased when the brake shoes engage the brake drums thereby providing a greater force to set or apply the brakes with a lower effort requirement on the part of the vehicle operator.

BRIEF SUMMARY OF THE DISCLOSURE

In the presently preferred embodiment of this invention, a two-piece articulated brake pedal assembly is pivotally supported at its upper end and forms a first class lever for moving a brake cable. The pedal assembly comprises pivotally interconnected pedal sections with a return spring interposed between the pedal sections. The return spring normally holds the lower pedal section in a retracted position whereby its axis is arranged at a generally 90° angle to the upper pedal section.

When the brake pedal pad is depressed, the pedal assembly moves through a short arc to remove slack in the system and to bring the shoes into contact with the brake drums. This displacement is done at a low mechanical advantage ratio corresponding to the length of the lever arm from the pivot of the brake pedal assembly to the pedal pad. When the shoes engage the drum, the lower pedal section swings to an extended position thereby increasing the length of the lever arm and increasing the effective mechanical advantage ratio of the pedal system. This provides an increase in brake applying force without a corresponding increase in operator effort at the pedal pad.

BRIEF DESCRIPTION OF THE DRAWINGS

The many objects and advantages of a brake pedal system constructed in accordance with the present invention will become apparent from the following detailed description and the accompanying drawings, in which:

FIG. 1 discloses a side elevational view of a parking brake pedal system constructed in accordance with this invention, the pedal lever being shown in the normal brake released position;

FIG. 2 is a side elevational view of the brake pedal system of FIG. 1 showing the brake pedal displaced to a position corresponding to initial engagement of the brake shoes with the brake drum; and FIG. 3 is a side elevational view of the brake pedal system of FIG. 1 showing the brake pedal displaced to a fully extended position corresponding to full engagement of the brake shoes with the brake drum.

DETAILED DESCRIPTION OF A PREFERRED EMBODIMENT

Referring now to the drawings, wherein the presently preferred embodiment of this invention is illustrated, FIG. 1 discloses a parking brake actuator suitable for use in a motor vehicle. The actuator of FIG. 1 includes a bracket 10 that is secured to vehicle support structure. A parking brake pedal assembly 12 includes an upper pedal section 14 and a lower pedal section 16. The pedal sections 14 and 16 are pivotally interconnected by the pivot pin 18. The pedal assembly 12 is pivotally connected to the bracket 10 by a pivot pin 20.

A Bowden wire 22 has its housing portion 24 secured to the bracket 10 and its cable portion 26 connected to the upper pedal section 14 by a clevis 28. The other end of the cable 26 is connected to the brake shoes of the rear brakes of a motor vehicle brake system.

The pedal assembly 12 includes a return spring 30 which biases the lower pedal section 16 with respect to the upper section 14 to the position shown in FIG. 1 where the two pedal sections are arranged at a generally right angle. A pedal pad 32 is pivotally connected to the end of the lower pedal section 16. A wire spring 34 biases the pedal pad 32 to a position whereby the end face of the pad 32 is generally perpendicular to the longitudinal axis of the pedal section 16.

Ratchet means is provided to hold the brake pedal assembly 12 in a brake applied position. The ratchet means includes a plurality of ratchet teeth 36 formed in an arc along the upper end of the pedal section 14. A pawl 38 is pivotally connected to the bracket 10 by a pin 40. A coil spring 42 is interposed between the pawl 38 and the bracket 10 is constructed to urge the pawl 38 into engagement with the ratchet teeth 36. A pull rod 44 is connected at one end to the pawl 38 and has a handle 46 on its other end. The rod 44 may be pulled to the right to cause the pawl 38 to disengage from the ratchet teeth 36.

OPERATION

FIG. 1 illustrates the orientation of the several components of the brake applying system when the parking brake is released. In order to apply the brake shoes to the brake drum, a vehicle operator places his foot on the pedal pad 32 and depresses it until the pedal assembly 12 is displaced to the position shown in FIG. 2. For this initial brake pedal movement, the mechanical advantage of the brake actuator system corresponds to the ratio between the distances from the pedal pivot 20 to the pad 32 and from the pivot 20 to the clevis 28. The parts of the system are dimensioned so that a relatively low mechanical advantage ratio is provided. A low ratio permits a small displacement of the pedal pad to produce sufficient displacement of the brake actuator system to remove slack in the brake cable and to bring the shoes into contact with the brake drum.

Once the shoes contact the drums, substantial resistance is encountered to further movement of the brake pedal assembly 12. The lower pedal section 16 will then automatically swing under the force of the vehicle operator's foot to the position shown in FIG. 3. In this orientation, the pedal sections 14 and 16 are in alignment. Stop members 48 and 50, which are welded to the pedal sections 16 and 14, respectively, come into engagement in order to prevent further displacement of the lower pedal section 16 with respect to the upper pedal section 14. When the pedal assembly 12 assumes the configuration shown in FIG. 3, an increase in mechanical advantage will be provided corresponding to the increase in the length of the lever arm between the pedal pivot 20 and pad 32.

The brakes of the vehicle will be held in an applied position by the pawl 38 which engages the ratchet teeth 36. The upper pedal section 14 will remain in its applied position as shown in FIG. 3 whereas the lower pedal section 16 will be free to swing upwardly to its retracted position when the vehicle operator removes his foot.

After the brakes have been applied, they may be released by pulling on the handle 46 causing the rod 44 to displace the pawl 38 from engagement with the ratchet teeth 36. This will permit the pedal assembly 12 to swing back to its FIG. 1 position under the force of a retractor spring (not shown) in the brake actuator system.

SUMMARY

In summary, the brake applying system of the present invention provides an arrangement whereby initial movement of the brake pedal assembly 14 will be at a low effective mechanical advantage ratio. With a low effective ratio, a less than normal initial movement of the brake pedal will produce substantial movement of the brake components to take up any slack or lost motion in the system. Subsequent brake pedal movement will be at a higher effective ratio whereby an increase in brake applying force will occur for the same force at the brake pedal pad 32.

The foregoing description presents the presently preferred embodiment of this invention. Modifications and alterations may occur to those skilled in the art that will come within the scope and spirit of the following claims.

I claim:

1. A variable ratio pedal assembly comprising a first pedal section, pivot means constructed to support said first pedal section on a support member, an actuator connected to said first pedal section, said first pedal section being displaceable between first and second positions, releasable ratchet means engaging said first section and constructed to retain said first section in its second position, a second pedal section pivotally connected to said first pedal section, said second pedal section having an operator engaging portion, said second pedal section being angularly displaceable from a first position to a second position relative to said first pedal section whereby the length of the lever arm from said pivot means to said portion is increased and the mechanical advantage ratio of said pedal assembly is correspondingly increased.

2. A variable ratio pedal assembly comprising a first pedal section, pivot means constructed to support said first pedal section on a support member, an actuator connected to said first pedal section, a second pedal section pivotally connected to said first pedal section, said second pedal section having an operator engaging portion, said second pedal section being angularly displaceable from a first position to a second position relative to said first pedal section whereby the length of the lever arm from said pivot means to said portion is increased and the mechanical advantage ratio of said pedal assembly is correspondingly increased, spring means interposed between said first and second pedal sections, said spring means being constructed to urge said second pedal section to said first position.

3. A variable ratio pedal assembly comprising a first pedal section, pivot means constructed to support said first pedal section on a support member, an actuator connected to said first pedal section, a second pedal section pivotally connected to said first pedal section, said second pedal section having an operator engaging portion, said second pedal section being angularly displaceable from a first position to a second position relative to said first pedal section whereby the length of the lever arm from said pivot means to said portion is increased and the mechanical advantage ratio of said pedal assembly is correspondingly increased, spring means interposed between said first and second pedal sections, said spring means being constructed to urge said second pedal section to said first position in which said second pedal section engages said first pedal section at a generally right angle.

4. A variable ratio pedal assembly comprising a first pedal section, pivot means constructed to support said first pedal section on a support member, an actuator connected to said first pedal section, a second pedal section pivotally connected to said first pedal section, said second pedal section having an operator engaging portion, said second pedal section being angularly displaceable from a first position to a second position relative to said first pedal section whereby the length of the lever arm from said pivot means to said portion is increased and the mechanical advantage ratio of said pedal assembly is correspondingly increased, spring means interposed between said first and second pedal sections, said spring means being constructed to urge said second pedal section to said first position in which said second pedal section engages said first pedal section at a generally right angle, said second pedal section being in general alignment with said first pedal section when said second pedal section is in its said second position.

5. A variable ratio parking brake pedal system comprising a depending pedal lever having pivotally interconnected first and second pedal sections, pivot means connecting said first pedal section to support structure and constructed to support said pedal lever for pivotal movement between a brake released position and a brake applied position, spring means interposed between said first and second pedal sections, said spring means being constructed to urge said second pedal section to a normal first pedal position in which said second pedal section is arranged at a generally right angle to said first pedal section, brake actuator means connected to said first pedal section, a pedal pad pivotally connected to said second pedal section, said second pedal section being displaceable to a second position in general alignment with said first pedal section whereby the length of the lever arm from said pivot means to said pedal pad is increased during a brake application, releaseable ratchet means engaging said first pedal section and constructed to hold said first pedal section in a brake applied position.

* * * * *